United States Patent
Hirth et al.

(10) Patent No.: US 8,360,470 B2
(45) Date of Patent: Jan. 29, 2013

(54) RESTRAINING SYSTEM

(75) Inventors: Andreas Hirth, Dielheim (DE); Lutz Quarg, Boeblingen (DE); Friedrich Reiter, Sindelfingen (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 153 days.

(21) Appl. No.: 12/600,418

(22) PCT Filed: Apr. 18, 2008

(86) PCT No.: PCT/EP2008/003126
§ 371 (c)(1),
(2), (4) Date: Apr. 1, 2010

(87) PCT Pub. No.: WO2008/138447
PCT Pub. Date: Nov. 20, 2008

(65) Prior Publication Data
US 2010/0230941 A1    Sep. 16, 2010

(30) Foreign Application Priority Data

May 14, 2007    (DE) .......................... 10 2007 022 925

(51) Int. Cl.
*B60R 21/08*    (2006.01)
*B60R 21/34*    (2011.01)

(52) U.S. Cl. ................... 280/748; 180/274; 280/728.1; 296/187.04

(58) Field of Classification Search ................ 180/274; 280/728.1, 730.1, 733, 734, 738, 743.1, 748, 280/749; 296/187.04; *B60R 21/08, 21/30, B60R 21/33, 21/34, 21/36*
See application file for complete search history.

(56) References Cited

U.S. PATENT DOCUMENTS

| | | | | |
|---|---|---|---|---|
| 2,859,048 | A | * | 11/1958 | Munn ............................ 280/733 |
| 3,573,885 | A | * | 4/1971 | Brawn et al. ................... 280/739 |
| 3,614,127 | A | * | 10/1971 | Glance .......................... 280/729 |
| 3,706,463 | A | * | 12/1972 | Lipkin .......................... 280/733 |
| 3,767,229 | A | * | 10/1973 | Cain ............................. 280/732 |
| 3,773,350 | A | * | 11/1973 | Shibamoto .................... 280/729 |
| 3,788,596 | A | * | 1/1974 | Maeda ............................ 251/69 |
| 3,822,076 | A | * | 7/1974 | Mercier et al. ................. 293/107 |
| 3,840,246 | A | * | 10/1974 | McCullough et al. ......... 280/738 |
| 3,960,386 | A | * | 6/1976 | Wallsten ....................... 280/731 |

(Continued)

FOREIGN PATENT DOCUMENTS

| DE | 3820145 | A1 | * | 1/1990 |
|---|---|---|---|---|
| DE | 102 39 778 | B3 | | 2/2004 |

(Continued)

OTHER PUBLICATIONS

Corresponding International Search Report (PCT/ISA/210) dated Sep. 2, 2008 with partial English translation, including Form PCT/ISA/220 and Form PCT/ISA/237 (Sixteen (16) pages).

*Primary Examiner* — Paul N Dickson
*Assistant Examiner* — Laura Freedman
(74) *Attorney, Agent, or Firm* — Crowell & Moring LLP

(57) ABSTRACT

A restraining system includes a restraining volume that is bounded by a cladding, and is deployable by expansion of the restraining volume, to restrain or protect an object or person. Deployment of the restraining volume by expanding it into a restraining position is performed by a mechanical enlarging unit, rather than by a pyrotechnic gas generator, so that the restraining system may be restored to a storage position following a deployment.

22 Claims, 2 Drawing Sheets

U.S. PATENT DOCUMENTS

| | | | | |
|---|---|---|---|---|
| RE29,228 E | * | 5/1977 | Hass | 280/738 |
| 4,565,535 A | * | 1/1986 | Tassy | 441/118 |
| 5,039,162 A | * | 8/1991 | Yoshida | 297/216.1 |
| 5,542,695 A | * | 8/1996 | Hanson | 280/729 |
| 5,597,179 A | | 1/1997 | Kornhauser | |
| 5,683,105 A | | 11/1997 | Jackson | |
| 6,227,325 B1 | * | 5/2001 | Shah | 180/274 |
| 6,497,302 B2 | * | 12/2002 | Ryan | 180/274 |
| 6,877,436 B2 | * | 4/2005 | Jung et al. | 102/530 |
| 6,910,714 B2 | * | 6/2005 | Browne et al. | 280/753 |
| 7,232,001 B2 | * | 6/2007 | Hakki et al. | 180/271 |
| 2004/0041380 A1 | | 3/2004 | Jung et al. | |
| 2007/0065614 A1 | * | 3/2007 | Schulthess | 428/36.1 |
| 2011/0031722 A1 | * | 2/2011 | Baumann et al. | 280/728.1 |
| 2011/0049846 A1 | * | 3/2011 | Hirth et al. | 280/729 |

FOREIGN PATENT DOCUMENTS

| | | |
|---|---|---|
| DE | 102 39 780 B3 | 2/2004 |
| DE | 10 2004 045 968 A1 | 6/2005 |
| JP | 07156749 A * | 6/1995 |
| JP | 2006232087 A * | 9/2006 |

* cited by examiner

RESTRAINING SYSTEM

This application is a national stage of PCT International Application No. PCT/EP2008/003126, filed Apr. 18, 2008, which claims priority under 35 U.S.C. §119 to German Patent Application No. 10 2007 022 925.0, filed May 14, 2007, the entire disclosure of which is herein expressly incorporated by reference.

The invention relates to a restraining system for example for a motor vehicle, and to a vehicle or the like with such a restraint system.

Such restraint systems are known, for example, from the series-production of passenger vehicles in the form of airbags in multiple embodiments. Such airbags thereby generally comprise a restraint volume limited by a cladding, which can be enlarged from a storage position into a restraint position. The airbag, which is usually folded in a storage position, is filled with gas in a pyrotechnical manner when an accident is detected, so that it deploys suddenly towards the occupant moving forward and contributes thus at least indirectly to his restraint. Accordingly, the gas introduced into the cladding usually by means of a gas generator serves to deploy the airbag on the one hand, and to restrain the respective person on the other hand.

It is however problematic under certain conditions to employ such a gas generator in certain environments—for example in aviation, where the use of such gas generators is impossible. Furthermore, other adverse influences of such gas generators (as for example an increased danger of explosion, increased costs, an increased weight and an increased construction volume) are known. Additionally, present-day airbags cannot be placed into some environments, for example in the rear compartment of a passenger vehicle, if children or small children are to sit behind it. A further disadvantage of conventional restraining systems is that they have to be replaced in a corresponding cost-intensive manner after use.

It is thus an object of the present invention to create a restraint system of the above-mentioned type, which can be used in a considerably broader application area.

This and other objects and advantages are achieved by the restraint system according to the invention, in which a mechanical enlarging unit is provided, by which the restraining system can be adjusted into the restraining position. Thus, in contrast to the previously known state of the art, enlargement of the restraining volume, and deployment of the restraining system, are effected, not by means of a gas generator, but rather in a mechanical manner—namely by means of the enlarging unit.

Such a mechanical enlarging unit can thereby be provided in a simple manner by suitable mechanical elements, as for example bar elements or spring elements. An advantage of such a mechanical enlarging unit is that it can for example be made reversible in a simple manner. It is thus possible, for example, to activate the restraining system or to adjust it into the restraining position in a preventive manner with an impending accident or an imminent collision, and to reset it into its storage position subsequent to the dangerous situation, in a relatively simple manner. The need to exchange the entire unit in the case of previous restraining systems with gas generators, is thus essentially eliminated.

A further advantage of such a mechanical enlarging unit is that the deployment and restraining effect of the restraining system are decoupled. That is, while the deployment or the transfer into the restraining position is performed by the mechanical enlarging unit, the restraining of the associated person is provided essentially by the restraining volume—preferably formed by the encased ambient air. The restraining effect is thereby achieved mainly via the internal pressure of the restraining volume. This can take place via a sealing of the restraining volume—possibly with outflow openings and/or untightnesses for dampening. If, as a result, the person impacts the cladding of the restraining volume, (s)he is retained correspondingly in a dampening manner.

By decoupling deployment from the restraining effect, it is thus possible to adjust with the restraining system according to the invention early into the restraining position. In contrast to a restraining volume formed by gas from a gas generator, it is thereby possible according to the invention to provide this restraining volume for a theoretically unlimited time in that the mechanical enlarging unit is correspondingly displaced into the restraining position. In other words, the restraining system thus does not collapse compared to a system filled by means of gas.

If a prediction system is thus used for example with a motor vehicle, with which an imminent accident or impact can be detected, the restraining system can already be adjusted into its restraining position early without the danger that the restraining volume collapses prematurely.

It is a further advantage of the invention that the prediction system needs not be able to make 100% safe decisions, due to its possible reversible design. The restraining system can thus also be released with less certain predictions, which additionally increases usage possibilities and the protection potential. With the advance positioning of the restraining system, the basic idea is utilized that the restraining volume—due for example to the inflown ambient air—can provide a sufficient dampening, for example, for the person to be retained. In other words, the restraining function is fulfilled according to the invention in that the corresponding restraining volume—for example in the form of ambient air—is limited correspondingly by the cladding, which can then provide a restraining effect during the impact of a person by means of compression of the gases contained in the volume and possibly a dampening by outflow possibilities for the gases.

In a further embodiment of the invention, it has also been shown to be advantageous if the enlarging unit for enlarging the restraining volume can be adjusted from a storage position into a restraining position. In other words according to the invention, enlargement of the restraining volume is advantageously achieved by a corresponding enlargement of the enlarging unit. This can take place in a simple manner, for example, by pulling the cladding immediately over the enlarging unit.

In a further embodiment of the invention, it has additionally been shown to be advantageous if the enlarging unit comprises a plurality of bar elements, tubes, ledges or the like, over which the cladding is arranged. By such bar elements, tubes or ledges, a corresponding restraining system can be provided or mounted in a simple manner, into which a person can for example immerse. The enlarging unit can thereby for example be enlarged into the restraining position in a simple manner via at least one spring element or the like, or only consist of one spring element, for example a spiral spring. A spring element has thereby the great advantage to be able to provide a reversibility of the entire restraining system.

In a further embodiment of the invention, materials of shape memory or memory materials, for example memory metal alloys, can be used for the components of the enlarging unit.

In a further embodiment of the invention, the restraining volume is formed in the restraining position at least essentially by ambient air present within the cladding. In other words, the restraining volume present within the cladding is preferably formed by ambient air, which is correspondingly aspired, enclosed or the like encased in the interior of the cladding during the adjustment of the enlarging unit.

This can take place for example if the cladding comprises at least one inlet opening, via which the ambient air is aspired conditionally by the adjustment of the enlarging unit or the low pressure forming temporarily within the cladding.

Furthermore, the restraining volume or the ambient air can be emitted from the cladding via at least one outlet opening, namely preferably if the restraining system shall deploy its restraining effect. By the outlet opening, the outflowing amount of ambient air, and thus the entire dampening of the restraining system, can be controlled in a simple manner. It has furthermore been shown to be advantageous if the restraining system is formed reversibly or can be used several times. It is possible hereby to activate the restraining system as early as possible, especially with a corresponding prediction system, without having to replace it, as is presently usual.

It is however also conceivable for example to accommodate the gas or air bag and the enlarging unit in a releasable device, which can be exchanged easily and which can additionally—possibly—be regenerated. It would thereby for example be conceivable to use a cartridge/magazine principle—as with a printer.

This has shown to be especially advantageous by the reversible use of the restraining system with the use with a prediction system by means of which an imminent accident, impact or the like can be detected with a motor vehicle. In this case, the restraining system preferably has a unit for communication with the prediction system, so that the restraining system can be deployed correspondingly early. If the danger has then passed, the restraining system can then be reversibly reset in a preferred manner, so as to prepare for the next emergency.

It is furthermore advantageous if the restraining system can also be released early by the user himself. By this, alternatively or additionally to a prediction system, a sensor system or the like, a further possibility is created to release the restraining system. This is especially conceivable if an accident, impact or the like takes place with a sufficient lead time, as for example with an emergency landing of an aircraft. Altogether, it is thus achieved in a simple manner that the restraining system is enlarged or deployed into the restraining position in advance, so that this is in place prematurely prior to the impact.

In a particularly simple embodiment, it would be conceivable that the transfer of the restraining system from the storage position or the storage extension into the restraining position or restraining extension—or back—takes place for example manually by concertina-like mounting. Hereby, spring elements or bar elements can for example be foregone. One or more mounted surfaces can be advantageous for easy mounting. However, these are not absolutely necessary. Loops or the like can serve for the mounting, which can possibly also serve for fastening to the safety belt or similar.

It has also been shown to be advantageous if a holding device is provided, by which the restraining system can for example be positioned releasably in a passenger compartment. By this, it is for example possible to apply an individually adapted restraining system, which can for example then be taken along into different passenger compartments by the user. It is for example possible to take along such a restraining system into a train compartment, a passenger compartment of a motor vehicle, or even into a cabin of an aircraft or a helicopter. The user of the restraining system needs only assure in mind in this case that the restraining system is positioned orderly by means of the holding device, so as to be able to ensure the corresponding restraining function.

A further usage of such a holding device is that it can for example be positioned at a safety belt in a releasable manner. A possibility is thus created again to have an individual restraining system ready for an emergency, which is for example adjusted to the body height or the body weight of the user.

For supporting the restraining function of the restraining system or the restraining volume, it can be provided in a further arrangement of the invention that a device for the additional gas and/or heat supply is provided, by which the restraining volume can be enlarged especially in the restraining position. In other words, it is conceivable to provide a small gas cartridge or a small heat source in addition to the enlarging unit, so as to be able to provide a correspondingly reliable restraining volume and a higher internal pressure. It can be seen that such a gas and/or heat source has to be kept very small however, as the essential deployment or enlarging of the restraining volume shall be achieved by the enlarging unit.

Alternatively to a gas and/or heat source, it would also be conceivable to generate mechanically an enlarged restraining volume and/or a higher internal pressure by the user. This could for example take place by a bellows, an air pump or the like, wherein the inlet opening of the cladding could possibly be provided with a nonreturn valve or the like for this. Altogether, a still better restraining effect of the restraining system can be achieved by such an enlarging of the restraining volume and/or the internal pressure.

In a further arrangement of the invention, it has additionally shown to be advantageous if the restraining volume is formed by a plurality of individual volume segments. Such volume segments thereby enable in a simple manner that no penetration of the user through the restraining volume can take place. Rather, an especially advantageous restraining function is achieved by the segmentation. Additionally, the restraining effect and the dampening of each individual segment can be designed separately.

The described advantages in connection with the restraining system according to the invention are valid in such a manner for a transport means which is equipped with such a restraining system. The restraining system can thereby be arranged within the passenger compartment, for example to fulfill the function of an airbag, and also outside the motor vehicle, to for example improve pedestrian protection during a frontal collision of the motor vehicle with a pedestrian.

Other objects, advantages and novel features of the present invention will become apparent from the following detailed description of the invention when considered in conjunction with the accompanying drawings.

DETAILED DESCRIPTION OF THE DRAWINGS

Figure 1:
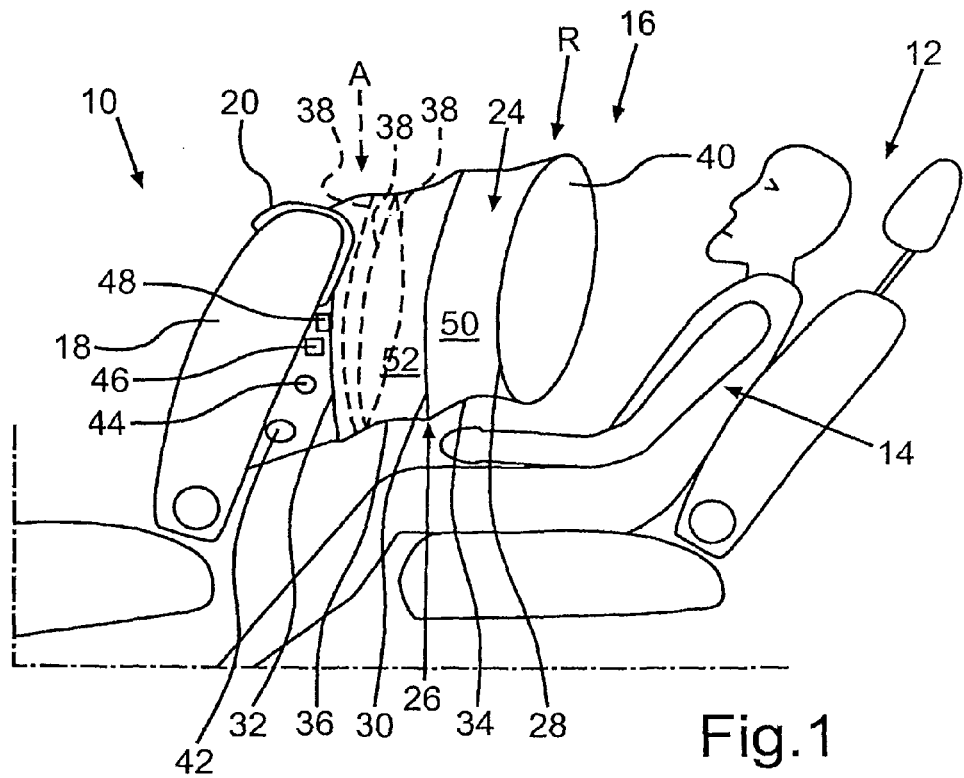
FIG. 1 a schematic side view of vehicle seats of a front and rear seat row of a motor vehicle, wherein a restraining system is assigned to a seat occupant positioned on the rear vehicle seat, the restraining volume of which has been adjusted or enlarged by a mechanical enlarging unit, from a storage position (not shown) into a restraining position, FIG. 2 a schematic perspective of a passenger vehicle shown in sections in the region of a front hood and a windshield, wherein a cushion-type restraining system extends along the windshield starting from the rear end of the front hood along the windshield, wherein the restraining volume of the restraining system is presently shown of the enlarged restraining position by a mechanical enlarging unit, FIG. 3 a schematic side view of the motor vehicle shown in sections with the restraining system according to FIG. 2.

FIG. 1 shows two vehicle seats 10, 12 arranged one behind the other in a schematic side view. The two vehicle seats 10, 12 can be assigned to respective front and back seat rows of a passenger vehicle. The two vehicle seats 10, 12 can alternatively also be assigned to another motor vehicle or bus, within a train compartment, or within a cabin of an aircraft.

It can be seen that a seat occupant 14 is present on the back vehicle seat 12. A restraining system 16 is assigned to this seat occupant 14, which system is presently positioned at the back side of a backrest 18 for example by means of a releasable holding device 20.

The restraining system 18 comprises a restraining volume 24 limited by a cladding 40, which volume is presently shown in an enlarged or deployed restraining position R.

So as to achieve this restraining position R, the restraining system 16 comprises a mechanical enlarging unit 26, which comprises a plurality of annular bar elements 28, 30, 32, tubes, ledges or the like. The respective bar elements 28, 30, 32 are connected to one another via a plurality of spring elements 34, 36. Alternative, it would also be conceivable, for example, to use a large spiral spring or the like as mechanical enlarging unit. It has to be considered within the scope of the invention that other combinations of spring and/or bar elements are also conceivable.

The enlarging unit 26 can be enlarged or extended from a storage position A shown with dashed lines into the restraining position R shown with continuous lines by these spring elements 34, 36. In other words, a mechanical device in the form of the enlarging unit 26 is presently created, by means of which the restraining volume can be enlarged or adjusted from the storage position A into the restraining position R, by a suitable combination of bar elements 28, 30, 32 or the like and spring elements 34, 36 or the like. Alternatively, at least one spiral spring can be provided in one embodiment, which unites the function of the bar and spring elements. Such a function is for example given with a revolving spiral spring.

The enlarging unit 26 with the bar elements 28, 30, 32 and the spring elements 34, 36 is thereby covered or shrouded by the cladding 40, which itself is essentially formed in such a manner that an inflow of a gas (especially air) enables that an outflow of the enclosed gas (especially the enclosed air), in a decelerated manner. In other words, the cladding 40 is formed in such a manner that the enlarged restraining volume 24 can be received therein.

This restraining volume 24 is formed by encased ambient air in the present case, which is received in the space limited by the cladding 40 during the deployment or enlarging by means of the enlarging unit 26. It is thereby for example conceivable that the ambient air can correspondingly be aspired, enclosed or encased during the deployment or enlarging of the enlarging unit 26. In the present embodiment, an inlet opening 42 is provided for this for example, via which ambient air can reach the interior of the cladding 40. This takes place in that a low pressure results during the extension of the enlarging unit 26 within the cladding 40, via which ambient air is aspired accordingly. An enclosure or another encasing of ambient air would naturally also be conceivable here. The inlet opening can for example also contain a non-return valve and/or serve as an outflow opening.

The restraining system 16 presently serves indirectly for restraining the person 14 for example during an accident or impact. In this case, because of the enlarging of the restraining volume 24 into the restraining position R, that the seat occupant 14 can immerse correspondingly into the restraining system 16. The restraining system 16 is thus formed as an airbag or acts as such. By the internal pressure of the restraining volume 24 or the ambient air within the cladding 40, an energy absorption or dampening of the movement of the seat occupant 14 is dampened in the forward direction, which he traverses during a corresponding collision or a corresponding impact. The enlarging unit 26 is thereby formed especially resiliently in such a manner by the spring elements 34, 36, that the restraining system 16 can deploy its restraining effect. The enlarging unit 26 can possibly contribute to the restraining of the person 14 within certain limits.

Altogether, it can be seen in FIG. 1, that a separation between the deployment or enlarging function on the one hand and the restraining function on the other hand is created. The deployment or enlarging function is essentially achieved by the enlarging unit 26, wherein a corresponding extension of the enlarging unit 26 in the backward direction and towards the seat occupant 14 is achieved by the spring elements 34, 36. The restraining function of the restraining system 16 is however—at least essentially—achieved by the restraining volume 24 limited by the cladding 40, which has previously been enlarged correspondingly by means of the enlarging unit 26. The inertia of the restraining volume or presently of the ambient air within the cladding is utilized thereby.

At least one outlet opening 44 can thereby be provided within the cladding 40, via which ambient air can flow out or to be released from the cladding 40, if the seat occupant impacts the restraining system. The dampening or energy absorption of the restraining system 16 can thus be adjusted in a simple manner. The at least one outlet opening 44 can thereby be provided with a closure, which opens when a certain load is exceeded, for example a certain internal pressure. The opening can thereby be reversible, for example by a spring-loaded or a resilient flap. An irreversible formation of the closure is also conceivable, for example in the form of a bursting membrane or the like. A practically unlimited holding time of the restraining volume 24 is thereby achieved by the closure without having to forego the important dampening by the outflow opening 44. This outflow is for example opened by an impingement or an impact of the seat occupant/user on the restraining system 16.

Especially in connection with a restraining system 16, which can be mounted manually by the user from the storage position or the storage extension into the restraining position or restraining extension, the advantage results hereby for example in an aircraft, that a possibly remaining restraining volume 24 can be pressed together easily during an evacuation, rescue or the like, so as to avoid an impediment hereby. An easy storage is thus also ensured. Spring elements or bar elements can be foregone hereby for example. One or several mounted surfaces can be advantageous for easy mounting. However, these are not coercively necessary. Loops or the like can serve for mounting, which possible can also serve for fastening to the safety belt or the like.

The present restraining system 16 can for example comprise a unit 46 for communication with a for example prediction system on the motor vehicle side (shown schematically), wherein an imminent impact or a collision of the motor vehicle or the like can be detected by the prediction system. The restraining system 16 can thus prematurely be enlarged or deployed into the restraining position R, so that this is in place prior to the impact. An arbitrary holding time is thereby possible by means of the enlarging unit 26, without the restraining volume 24 reducing essentially. A slow and harmless deployment of the restraining system 16 is thus possible by means of the enlarging unit 26. A forward-looking sensing of imminent accidents can thus correspondingly be realized by means of the restraining system 16, so as to offer a corresponding restraining of the person to be protected.

Such a forward-looking sensing of the restraining system 16 be used not only with motor vehicles, buses or trains, but rather also with shipping, air or space travel.

It is further conceivable that the restraining system 16 can also be released early by the user himself. It is hereby possible that no prediction system, no sensor system or the like is needed. This is especially conceivable if an accident, impact or the like takes place with a sufficient lead time, as for example with an emergency landing of an aircraft. Altogether, it is achieved in a simple manner that the restraining system 16 is enlarged or deployed early into the restraining position R, so that this is in place prior to the impact.

Furthermore, a device 48 (indicated symbolically), can be assigned to the restraining system 16 for additional gas and/or heat supply, by means of which the restraining volume 24 can for example additionally be enlarged in the restraining position R. In other words, the internal pressure within the cladding 40 can possibly also be increased via such a device 48 in the restraining position R within certain limits, for example to develop an especially good restraining effect. It is however obvious that the essential enlarging of the restraining volume starting from the storage position A into the restraining position R shall take place by means of the enlarging unit 26.

The holding device 20 of the restraining system shown in FIG. 1 can for example also be used so that this can be fixed to a safety belt.

In the present embodiment, the restraining volume 24 of the restraining system 16 is divided into a plurality of individual volume segments 50, 52. An own cladding can thereby be assigned to the individual volume segments 50, 52. By this segmentation of the restraining volume 24, it is achieved especially that the seat occupant 14 cannot penetrate up to the backrest 18. An especially good restraining effect is rather achieved by such a segmentation. A different design is also possible for each of the volume segments 50, 52.

Figure 2:
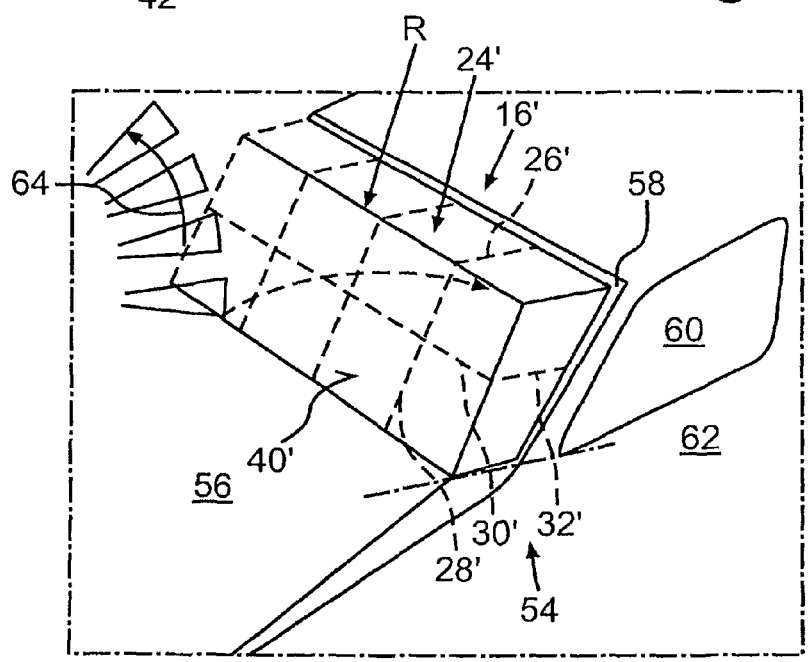
Figure 3:
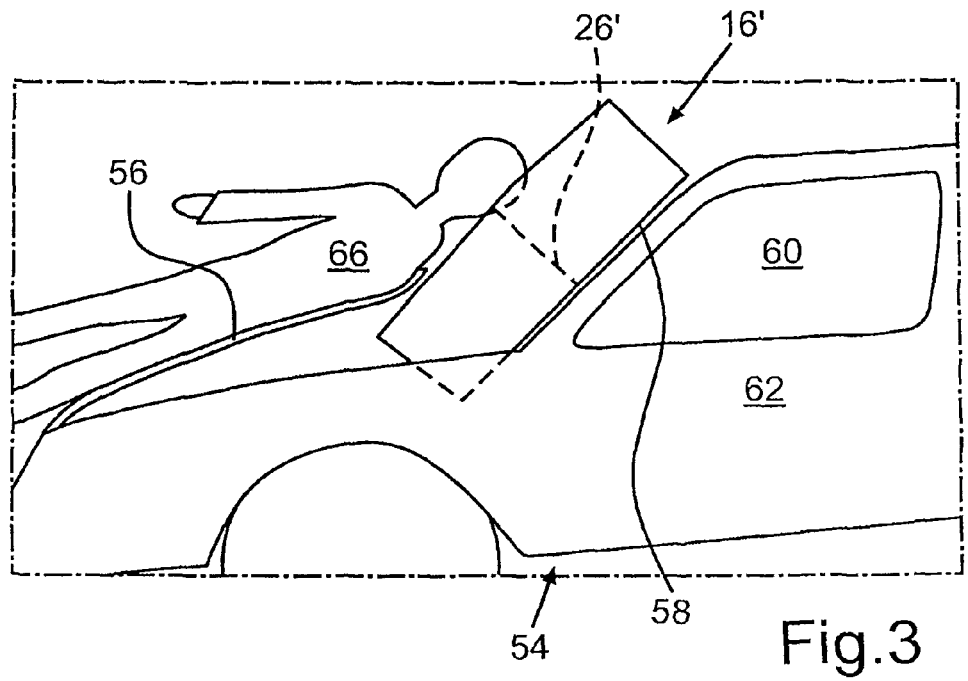

In FIGS. 2 and 3 is shown a motor vehicle in sections in the form of a passenger vehicle 54 in a schematic perspective or a schematic side view. Of the motor vehicle 54, especially a front hood 56, a windshield 58, and a front side window 60 of a corresponding side wall 62 can be seen. In FIGS. 2 and 3 it can further be seen that the front hood 56—as shown by the arrow 64 in FIG. 2—has already been brought into a lifted position with its rear end, so as to fulfill the requirements of the pedestrian protection. The impact of a pedestrian on the front hood 56 can thereby be seen in FIG. 3.

So as to avoid an impact of the pedestrian 66 on the windshield 58 especially with his head, a restraining system 16' is provided, which is shown in FIGS. 2 and 3 in the already deployed restraining position R. The restraining system 16' thereby essentially comprises a prismatic basic contour and extends from the rear end of the front hood 56 over approximately the entire width or height of the windshield 58.

The deployment of the restraining system 16' presently again takes place by means of an enlarging unit 26', of which some bar elements 28', 30', 32' can be seen only schematically with lines. The bar elements 28', 30', 32' are again connected to one another by means of spring elements (not shown). Thus, reversible enlarging unit 26' is also created, which can be reset after use, so that it can be used anew. The bar and spring elements can also be designed in one unit here, for example also as a bar-shaped leaf spring. It is obvious that the present restraining system 16' can also be assigned to a corresponding forward-looking sensor system or a prediction system, which detects an imminent impact of a pedestrian 66. So that the motor vehicle 54 can still be steered in the case of a deployed restraining system 16', it is for example conceivable to design the cladding 40' of the restraining system 16' in a transparent manner. Thus, a free view to the front for the driver also remains with a restraining system 16 transferred into the restraining position R. The restraining system 16' is then for example concealed below the front hood 56 or below the windshield 58 in the storage position A, not shown.

Figure 4:
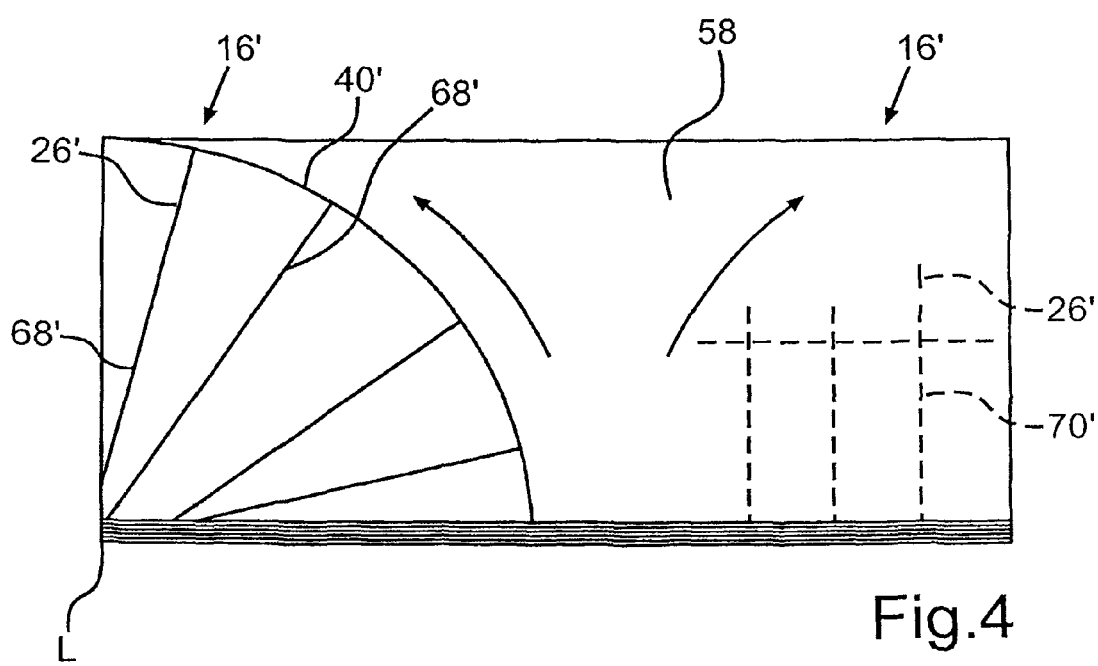
FIG. 4 a schematic front view of the windshield of the motor vehicle according to FIGS. 2 and 3, wherein the restraining system is shown in alternative embodiments.

Finally, two alternative embodiments of the restraining system 16' according to FIGS. 2 and 3 are shown in FIG. 4. FIG. 4 thereby shows the windshield 58 in a front view. The left restraining system 16' is also shown in a front view, which is formed in a quadrant manner and which comprises an enlarging unit 26', which comprises bar elements 68' arranged in a fan-like manner to one another. The bar elements 68' can be folded in a pivotal manner around an axis L proceeding in the longitudinal direction of the vehicle below the front hood 56. Accordingly, the cladding is correspondingly formed in a segment of a circle according to FIG. 4.

The right embodiment shown in FIG. 4 shows an enlarging unit 26', the bar elements 70' of which are arranged in an alternative manner. With the embodiments in front of the windshield, it is conceivable to use correspondingly formed windshield wipers or their motors for the deployment.

It can thus altogether be seen from FIGS. 2 to 4, that a restraining system 16' is created for the outer arrangement at the motor vehicle 54, by means of which a contribution to the pedestrian protection is achieved. The enlarging or deployment of the restraining system 16' from its restraining effect is again thereby separated by means of the enlarging unit 26', which essentially results by the internal pressure resulting within the cladding 40'.

Within the scope of the invention it is to be considered that the technical arrangements and characteristics described in connection with FIG. 1 can also be used with the embodiments according to FIGS. 2 to 4.

In addition to passenger compartments or outer sides of motor vehicles, the described restraining systems 16, 16' are also suitable for use as a simple and cost-effective possibility to correspondingly protect all passengers of aircraft. The restraining system 16 can thereby for example be integrated into the backrest of the front seat. A further example is a mechanical airbag cushion, which can be transported and can be placed on the legs. This can be retrofitted without any effort. A provision is thus possible through airline companies—similar to a life jacket—or through the occupant himself—via retail outlets.

With helicopters, a protection for occupants from accelerations which are too high, especially in the vertical direction, can be created, wherein the restraining systems 16, 16' can be placed under the occupant or the helicopter.

It would likewise be conceivable to protect loads by such a restraining system 16, 16' from an excessive acceleration or damage.

It is to be considered within the scope of the invention that these restraining systems 16, 16' can also be formed in a transportable manner. It would thus for example be conceivable to use them for protection against an impact for example with a ladder or a child seat. It would also be conceivable to use these restraining systems 16, 16' in space travel. Especially capsules could thereby be restrained prior to landing by a correspondingly early released restraining system 16, 16'.

Such a protection then describes an indirect restraining of the respective person or the respective cargo.

It is also considered within the scope of the invention that the restraining system 16, 16' can also be formed for cargo securing or cargo restraining, so as for example to secure cargo within a storage space or to protect the vehicle occupants from injuries by the cargo.

Finally, it would also be conceivable that the restraining system 16, 16' is formed as an avalanche protection element. This gives the skier the chance to remain as far on top as possible in an avalanche—by means of the gas/air present within the cladding 40. The effect of the restraining system 16, 16' is not based on floating in the classical sense, as the specific weight of a skier is larger than the one of flowing snow, even with an inflated restraining system 16, 16', so that the skier would have to perish in an avalanche even with an inflated restraining system 16, 16' according to the laws of hydrostatics. So that the restraining system 16, 16' still has the desired effect, this can be explained by a sorting effect, namely, because an avalanche composed of snow chunks of different sizes is physically a flowing granulate. A demixing takes place under the influence of gravity, by which the large particles reach the surface sooner, smaller rather reach the lower layers. A large part is thereby created by the restraining system 16, 16', which profits from this sorting effect and which is more likely to be positioned at the surface of the avalanche.

The restraining system 16, 16' can finally also possibly be used as a flotation device. It is obvious that individual protection functions can possibly also be realized by one and the same restraining system 16, 16'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A restraining system having a restraining volume delimited by a cladding, which restraining volume is enlargeable from a storage position to a restraining position, in which the restraining volume serves at least indirectly to restrain a person or an object, wherein:
   the enlargement from the storage position to the restraining position is achieved without involvement of a gas generator by either at least one spring element or manually,
   the at least one spring element
      is a bar-shaped leaf spring,
      is a revolving spiral spring, or
      connects at least one of a bar element, a tube and a ledge that is arranged perpendicular to the at least one spring element in the restraining position, and
   an enlarging unit that increases the restraining volume from the storage position to the restraining position the enlarging unit comprises
      the at least one of a bar element, a tube and a ledge in a form that is one of straight, arcuate and bent above which the cladding is located,
      at least one of a plurality of bar elements, tubes and ledges that are straight, arcuate and bent above which the cladding is located, or
      the revolving spiral spring above which the cladding is located.

2. The restraining system according to claim 1, wherein the manually enlarging the restraining volume from a storage position into a restraining position is achieved by pulling up a surface or by tensioning loops.

3. The restraining system according to claim 1, wherein the restraining volume in the restraining position is formed at least substantially by ambient air present in the cladding.

4. The restraining system according to claim 3, wherein the ambient air can be brought from the storage position into the restraining position within the cladding during the enlarging of the restraining volume.

5. The restraining system according to claim 3, wherein the cladding is provided with at least one inlet opening for the ambient air.

6. The restraining according to claim 5, wherein the inlet opening is assigned to a valve.

7. The restraining system according to claim 1, wherein the restraining volume or ambient air is releasable from the cladding via at least one outlet opening.

8. The restraining system according to claim 7, wherein the at least one outlet opening of the cladding is provided with a closure, which opens when a preset load is exceeded.

9. The restraining system according to claim 1, wherein the restraining system is a reversible manner so that it can be used several times.

10. The restraining system according to claim 1, wherein the restraining system is actuatable by a user.

11. The restraining system according to claim 1, further comprising a unit for communication with a prediction system, by which an imminent, impact is to be determined.

12. The restraining system according to claim 1, further comprising a holding device for releasably holding the restraining system in a passenger compartment.

13. The restraining system according to claim 1, further comprising a holding device for releasably positioning the restraining system at a safety belt.

14. The restraining system according to claim 1, further comprising:
   a device for an additional gas or heat supply;
   the restraining volume or its internal pressure is enlargeable by the device for an additional gas heat supply.

15. The restraining system according to claim 1, wherein the restraining volume is formed by a plurality of individual volume segments.

16. The restraining system according to claim 15, wherein cladding is assigned to the individual volume segments.

17. The restraining system according to claim 16, wherein the cladding is arranged in an exchangeable or regenerative device.

18. The restraining system according to claim 1, wherein the restraining system is formed for cargo securing or cargo restraining.

19. The restraining system according to claim 1, wherein the restraining system comprises an avalanche protection element or flotation device.

20. A vehicle comprising a restraining system according to claim 1, arranged on one of an inside and an exterior thereof.

21. The restraining system according to claim 1, wherein the cladding is transparent.

22. The restraining system according to claim 1, wherein the enlargement from the storage position to the restraining position is achieved by only one spring element.

* * * * *